(12) United States Patent
Tanaka et al.

(10) Patent No.: US 7,486,856 B2
(45) Date of Patent: Feb. 3, 2009

(54) BEAM HOMOGENIZER AND LASER IRRADIATION APPARATUS

(75) Inventors: Koichiro Tanaka, Atsugi (JP); Hirotada Oishi, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 235 days.

(21) Appl. No.: 11/079,298

(22) Filed: Mar. 15, 2005

(65) Prior Publication Data

US 2005/0213218 A1 Sep. 29, 2005

(30) Foreign Application Priority Data

Mar. 24, 2004 (JP) ............................. 2004-088037

(51) Int. Cl.
  *G02B 6/32* (2006.01)
  *G02B 27/10* (2006.01)
(52) U.S. Cl. ..................... 385/33; 359/621; 359/624
(58) Field of Classification Search .............. 385/33; 359/621, 624
  See application file for complete search history.

(56) References Cited

U.S. PATENT DOCUMENTS

| 5,083,199 A | 1/1992 | Borner |
| 5,923,475 A | 7/1999 | Kurtz et al. |
| 6,064,528 A | 5/2000 | Simpson, Jr. |
| 6,212,011 B1 | 4/2001 | Lissotschenko et al. |
| 6,246,524 B1 | 6/2001 | Tanaka |
| 6,300,176 B1 | 10/2001 | Zhang et al. |
| 6,392,810 B1 | 5/2002 | Tanaka |
| 6,513,953 B1 | 2/2003 | Itoh |
| 6,689,651 B2 | 2/2004 | Zhang et al. |
| 6,700,709 B1 | 3/2004 | Fermann |
| 6,750,424 B2 | 6/2004 | Tanaka |
| 2002/0191301 A1 | 12/2002 | Tanaka |
| 2005/0111105 A1* | 5/2005 | Tanaka .................. 359/619 |

FOREIGN PATENT DOCUMENTS

| DE | 196 23 749 | 5/1997 |
| EP | 1 003 207 | 5/2000 |
| EP | 1 031 870 | 8/2000 |
| JP | 08-88196 | 4/1996 |

OTHER PUBLICATIONS

Ozaki et al., *Cylindrical Fly's Eye Lens for Intensity Redistribution of an Excimer Laser Beam*, Applied Optics, vol. 28, No. 1, Jan. 1, 1989, pp. 106-110.
European Search Report (Application No. 05006161.3) dated May 16, 2007.
Partial European Search Report dated Mar. 2, 2006 for Application No. 05006161.3.

* cited by examiner

*Primary Examiner*—Charlie Peng
(74) *Attorney, Agent, or Firm*—Eric J. Robinson; Robinson Intellectual Property Law Office, P.C.

(57) ABSTRACT

Since the arrangement of the optical elements in the optical system is limited because of their characteristic, designing the optical system for forming the desired laser beam is difficult. An object of the present invention is to design the optical system having the desired function without being affected by the limit in the arrangement of the optical elements.

Consequently, an off-axis cylindrical lens array is used as a cylindrical lens array acting on a long-side direction of the beam.

10 Claims, 13 Drawing Sheets

FIG. 1A side view
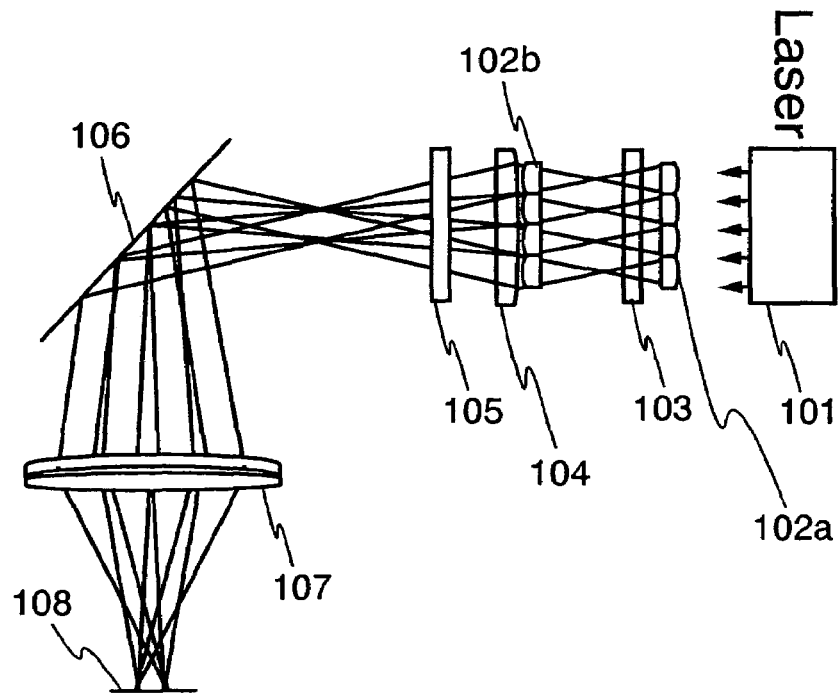
FIG. 1B top view
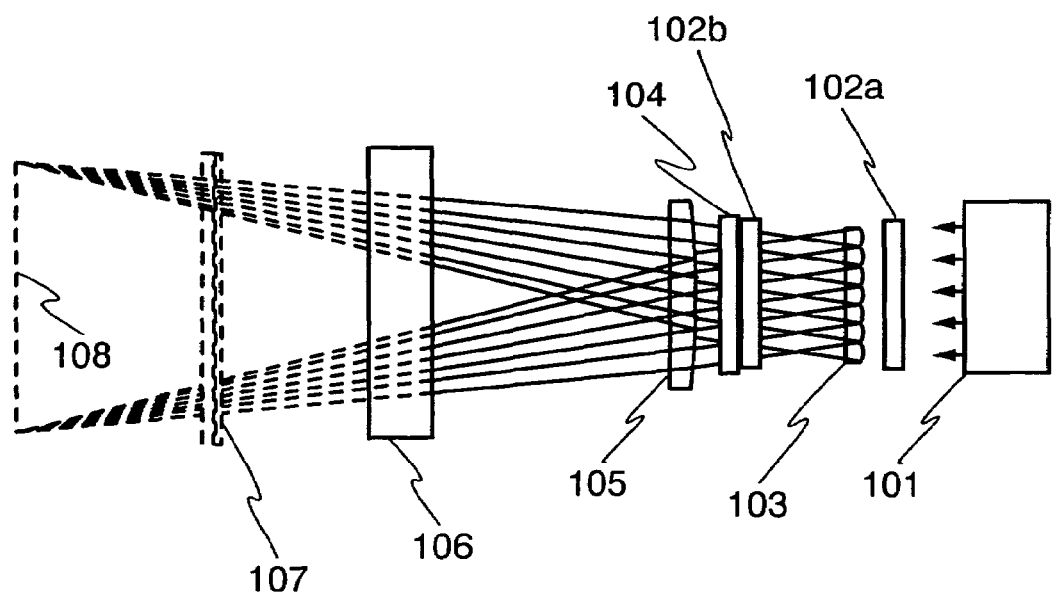

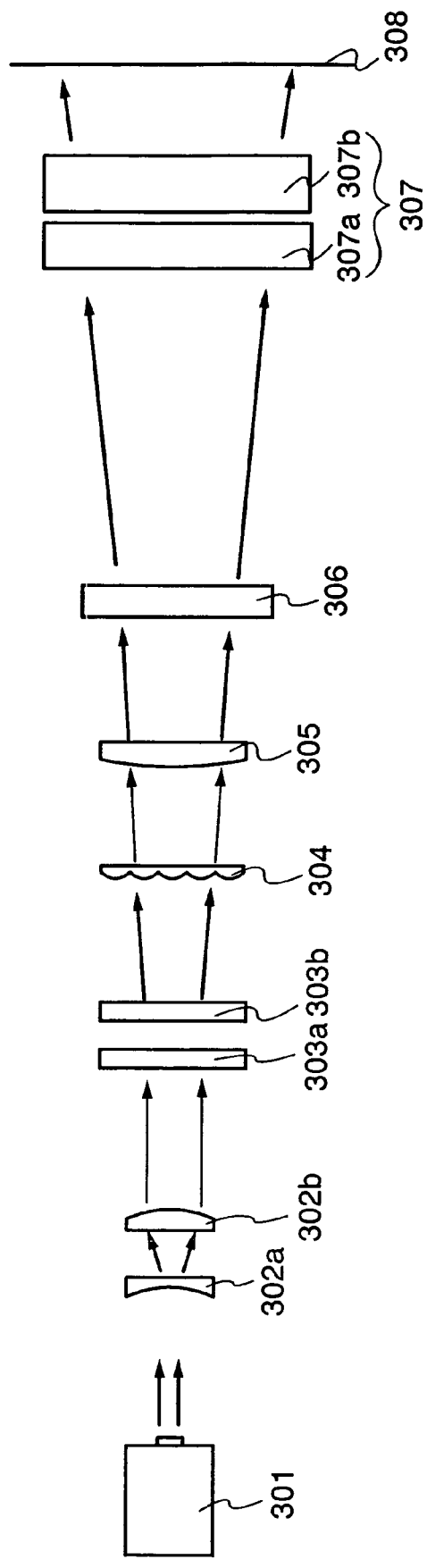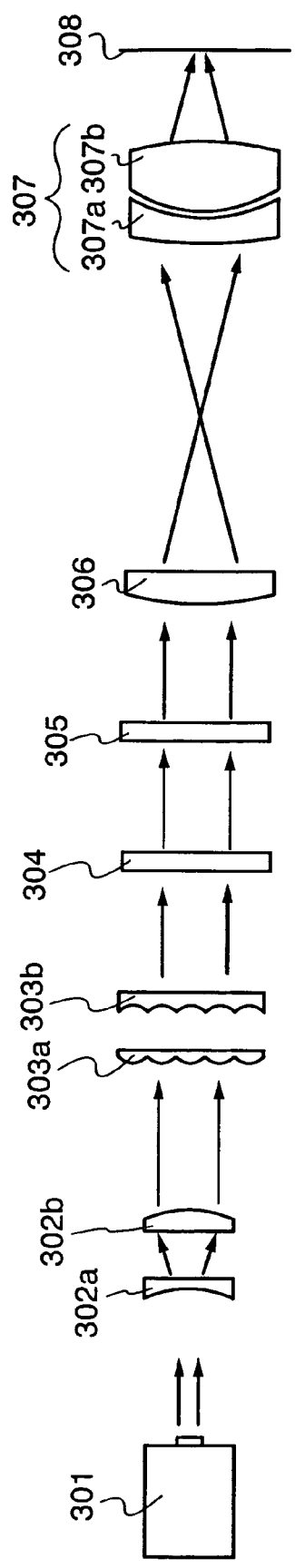
FIG. 3A plan view
FIG. 3B top view

Beam length (mm)

Beam width (μm)

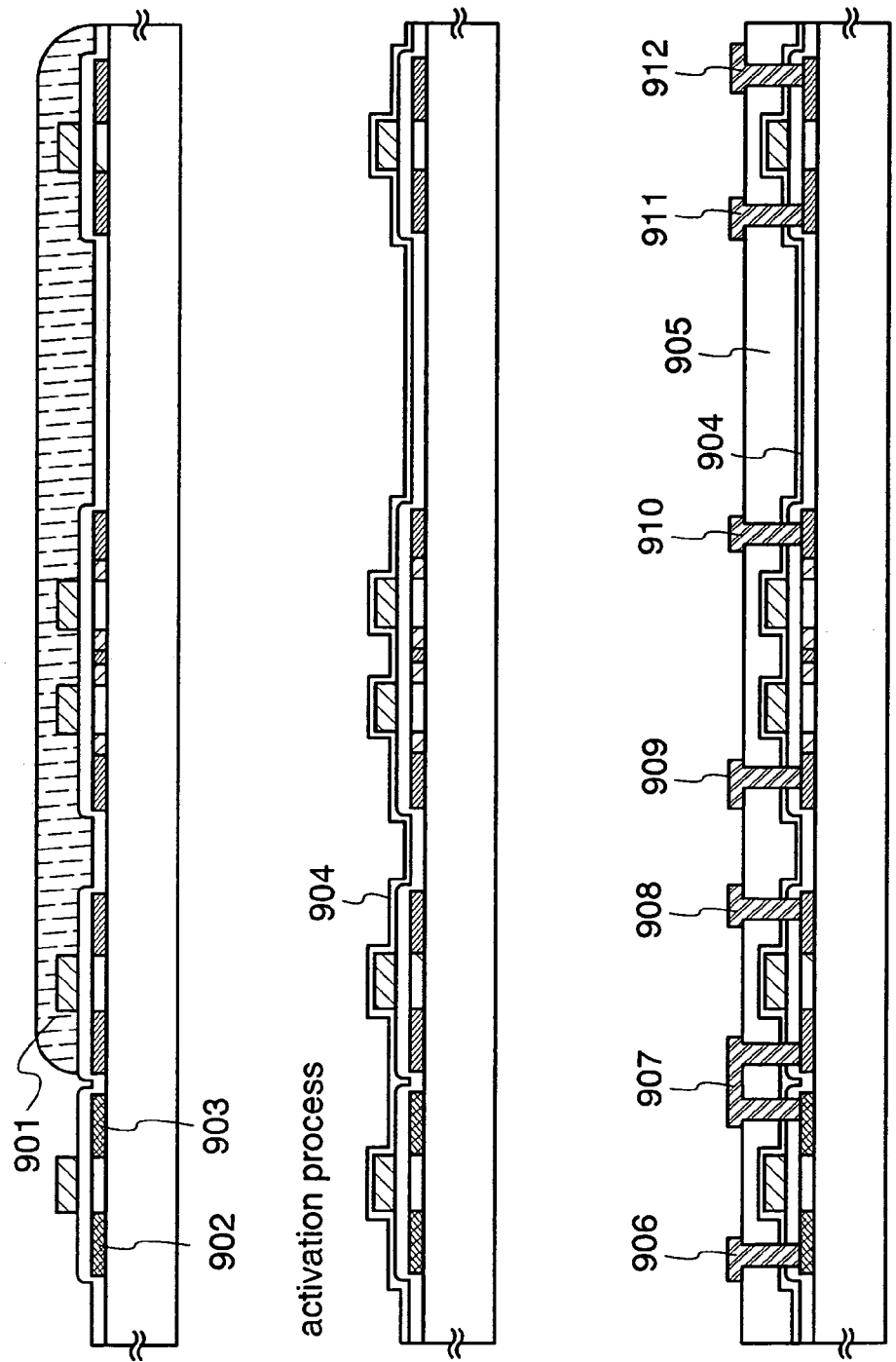

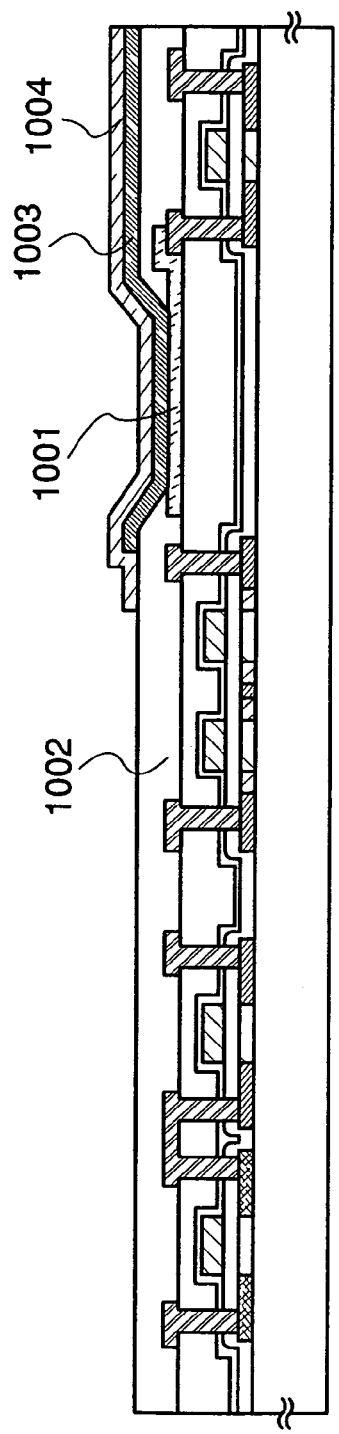
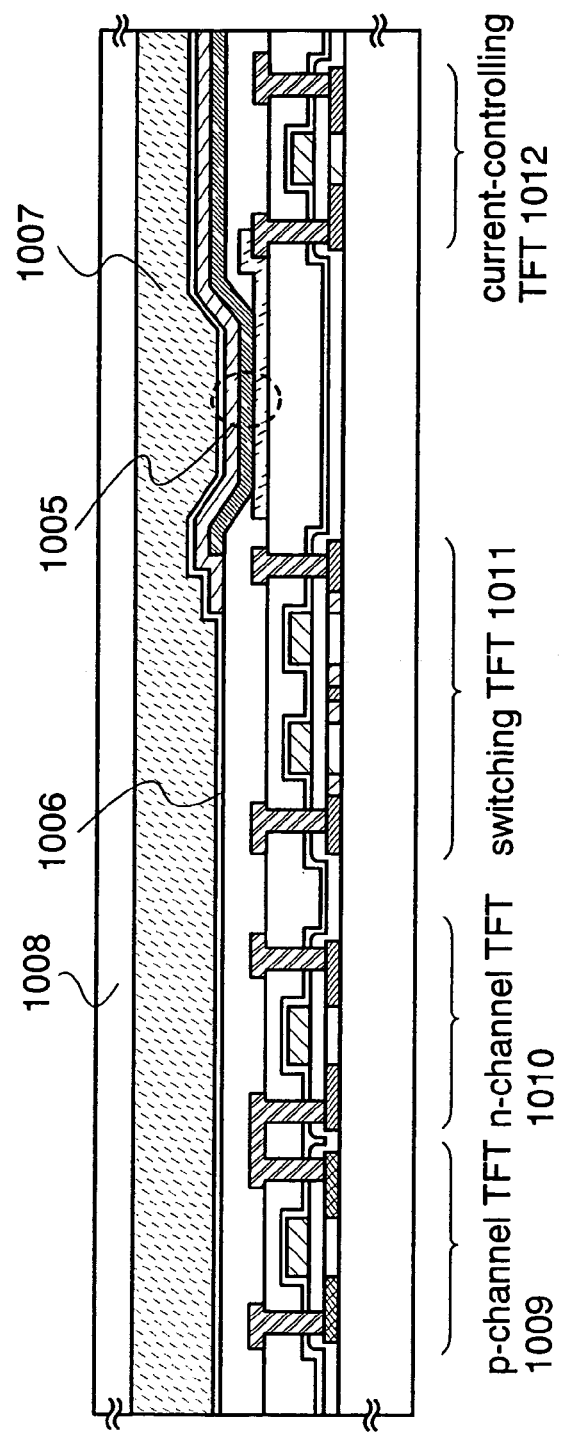
FIG. 10A
FIG. 10B

BEAM HOMOGENIZER AND LASER IRRADIATION APPARATUS

BACKGROUND OF THE INVENTION

1. Field of the Invention

The present invention relates to a beam homogenizer for homogenizing a beam spot on an irradiation surface in a particular region. Moreover, the present invention relates to a laser irradiation apparatus to irradiate the irradiation surface with the beam spot.

2. Background Art

In recent years, a technique has been widely researched in which laser annealing is performed to crystallize a non-single crystal semiconductor film formed over an insulating substrate such as a glass substrate or to enhance the crystallinity of the non-single crystal semiconductor film. The non-single crystal semiconductor film is, for example, an amorphous semiconductor film (a-Si:H) or a crystalline semiconductor film (a semiconductor film having crystallinity such as a poly-crystalline semiconductor film and a microcrystal semiconductor film (μc-Si:H)). A silicon film is often employed as the semiconductor film.

In comparison with a quartz substrate which has been often used conventionally, the glass substrate is inexpensive and superior in workability, and therefore the glass substrate has an advantage that it can be processed easily into a large substrate. This is the reason why the research as above has been conducted. Moreover, a laser is often employed in the crystallization because the glass substrate has a low melting point. The laser can give high energy only to the non-single crystal semiconductor film without increasing the temperature of the substrate that much.

The crystalline silicon film is referred to as a poly-crystalline silicon film or a poly-crystalline semiconductor film because it has plenty of crystal grains. Since the crystalline silicon film formed by the laser annealing has high mobility, it is often used in a monolithic liquid crystal electro-optic device and the like. In such devices, the crystalline silicon film is used in a thin film transistor (TFT), and the TFT for driving a pixel and the TFT for a driver circuit are manufactured over a glass substrate.

It is preferable to perform the laser annealing in such a way that a pulsed laser beam emitted from an excimer laser or the like that has high output power is shaped into a square spot having a length of several cm on a side or a line having a length of 10 cm or more on the irradiation surface by an optical system and then the beam spot is scanned (the irradiation position of the laser beam is moved relative to the irradiation surface) because this method has high productivity and is superior industrially.

Particularly, when the laser beam has a linear shape, unlike a punctate beam spot that requires to be scanned from front to back and from side to side, the linear beam spot may be scanned only in a direction perpendicular to a long-side direction of the beam spot to perform the laser irradiation all over the irradiated substrate. Therefore, high productivity can be obtained. The linear beam spot is scanned in the direction perpendicular to the long-side direction because this is the most effective scanning direction. Because of this high productivity, the laser annealing is mainly employing the linear laser beam formed by shaping the pulsed excimer laser beam through an appropriate optical system.

FIGS. 1A and 1B show an example of an optical system for shaping a cross section of the laser beam into linear on the irradiation surface. This optical system not only shapes the cross section of the laser beam into linear but also homogenizes the energy of the laser beam on the irradiation surface simultaneously. Generally, the optical system for homogenizing the energy of the laser beam by using an optical element (a cylindrical lens, a doublet lens, or the like) is referred to as a beam homogenizer.

First, a side view of FIG. 1A is described. A laser beam emitted from a laser oscillator 101 is divided in a direction perpendicular to a traveling direction of a laser beam by cylindrical lens arrays 102a and 102b. This direction is hereinafter referred to as a vertical direction. In this constitution, the laser beam is divided into four beams. These divided beams are converged into one beam once by a cylindrical lens 104. Then, after the laser beam is reflected on a mirror 106, the laser beams are converged again into one laser beam on an irradiation surface 108 by a doublet cylindrical lens 107. A doublet cylindrical lens is a set of lenses consisting of two cylindrical lenses. This homogenizes the energy of the linear laser beam in a short-side direction and determines the length thereof in the short-side direction.

Next, a top view of FIG. 1B is described. The laser beam oscillated from the laser oscillator 101 is divided by a cylindrical lens array 103 in a direction that is perpendicular to the traveling direction of the laser beam and that is perpendicular to the vertical direction. The direction perpendicular to the vertical direction is hereinafter referred to as a horizontal direction. The laser beam is divided into seven beams in this constitution. After that, the divided beams are combined into one beam on the irradiation surface 108 by a cylindrical lens 105. This homogenizes the energy of the linear laser beam in a long-side direction and determines the length thereof in the long-side direction.

Each of the lenses is made of quartz in order to correspond to the excimer laser. In addition, the surfaces of the lenses are coated so that the laser beam emitted from the excimer laser transmits through the lenses very much. This makes transmittance of the excimer laser beam 99% or more per one lens.

The non-single crystal silicon film is irradiated with the linear laser beam formed by the above constitution as being overlapped in such a way that the linear beam is displaced gradually in the short-side direction of the linear laser beam. Accordingly, the laser annealing can be performed all over the surface of the non-single crystal silicon film so as to crystallize it or to enhance its crystallinity.

A poly-crystalline silicon film is obtained by shaping the pulsed excimer laser beam into linear through the optical system described above and irradiating, for example, the non-single crystal silicon film with the linear laser beam while scanning the linear laser beam.

In the obtained poly-crystalline silicon film, horizontal and vertical stripes are observed. When the poly-crystalline silicon film having such stripes is used to manufacture a display device with a driver and a pixel integrated (system-on-panel), the stripes directly appear on a screen because the semiconductor characteristic differs in each of the stripes. The stripes on the screen result mainly from the inhomogeneous crystallinity in the pixel portion. This problem can be reduced by improving the laser beam or the quality of the non-single crystal silicon film, which is the irradiation surface of the laser beam.

Particularly, the stripes appearing in parallel with the scanning direction of the linear laser beam mainly result from the design of the optical system for shaping the laser beam. Although various optical systems have been designed for this reason, it is difficult to design the optical system to form a desired laser beam because the optical elements constituting the optical system have their own limits in the arrangement depending on their characteristics.

SUMMARY OF THE INVENTION

Consequently, an object of the present invention is to design an optical system having a desired function without being affected by the limit in the arrangement of the optical elements. Moreover, another object of the present invention is to provide a beam homogenizer having a desired function without being affected by the limit in the arrangement of the optical elements. Furthermore, another object of the present invention is to provide a laser irradiation apparatus using this beam homogenizer.

In the present invention, the optical system is designed so that a first optical element for converging a laser beam spot in one direction is set at the side of an irradiation surface, that a second optical element for dividing the laser beam spot in the one direction is set at the side of a light source, and that the irradiation surface is conjugated through the first optical element with a hypothetical plane where the laser beams that are divided by the second optical element are superposed when the laser beams are extended to the side of the light source.

A beam homogenizer of the present invention comprises an off-axis cylindrical lens array for dividing a laser beam spot in one direction and an optical element for converging the laser beam spot in the one direction.

Another beam homogenizer of the present invention comprises an optical element for dividing a laser beam spot in a short-side direction of the rectangular shape, an off-axis cylindrical lens array for dividing the laser beam spot in a long-side direction of the rectangular shape, an optical element for converging the laser beam spot in the long-side direction, and an optical element for converging the laser beam spot in the short-side direction.

A laser irradiation apparatus of the present invention comprises a laser oscillator for oscillating a laser beam, an off-axis cylindrical lens array for dividing a laser beam spot in one direction, and an optical element for converging the laser beam spot in the one direction.

Another laser irradiation apparatus of the present invention comprises a laser oscillator for oscillating a laser beam, an optical element for dividing a laser beam spot in a short-side direction of the rectangular shape, an off-axis cylindrical lens array for dividing the laser beam spot in a long-side direction of the rectangular shape, an optical element for converging the laser beam spot in the long-side direction, and an optical element for converging the laser beam spot in the short-side direction.

The cylindrical lens to be used usually is symmetric along the generating line. On the other hand, the off-axis cylindrical lens mentioned above is asymmetric along the generating line. When the off-axis cylindrical lenses are used as the cylindrical lens array, it is possible to control the traveling direction of the laser beam freely. Consequently, the off-axis cylindrical lens array is used as the cylindrical lens array that acts on the long-side direction of the rectangular shape. The generating line described in this specification indicates a generating line located at a curved portion of the cylindrical lens that is the farthest from the plane portion of the cylindrical lens.

In the present invention, the off-axis cylindrical lens array comprising a plurality of off-axis cylindrical lenses includes the off-axis cylindrical lens whose displaced amount between the generating line and the center axis of the lens is designed in accordance with the desired beam length, the curvature of the converging lens, and the curvature of the cylindrical lens constituting the array. Moreover, the off-axis cylindrical lens array is designed so that when it is combined with the converging lens for the long-side direction, the rays transmitted through the respective off-axis cylindrical lenses are superposed in the same region on the irradiation surface. For example, when the off-axis cylindrical lens array includes an odd number of cylindrical lenses, the normal cylindrical lens is set in the center of the array and the off-axis cylindrical lenses are arranged at opposite sides of the normal cylindrical lens in such a way that the displaced amount between the generating line and the center axis of each off-axis cylindrical lens increases toward the opposite ends of the array.

In the present invention, the above problem is solved by combining the off-axis cylindrical lens array for the long-side direction with the converging cylindrical lens for the long-side direction.

The advantage of this combination is that the optical system can be designed with a large degree of freedom. Conventionally, the arrangement of the converging cylindrical lens for the long-side direction has been limited. However, when the off-axis cylindrical lens array is used, it is possible to design the optical system while controlling the traveling direction of the rays after transmitting through the converging cylindrical lens for the long-side direction. Accordingly, the degree of freedom in designing the optical system increases, and the converging cylindrical lens for the long-side direction can be set in a desired position.

Moreover, it becomes possible to design the optical system having the desired function, for example for further homogenizing the energy distribution of the laser beam in the long-side direction.

BRIEF DESCRIPTION OF DRAWINGS

In the accompanying drawings:

FIGS. 1A and 1B are drawings for showing the conventional laser irradiation apparatus;

FIGS. 3A and 3B are drawings for showing an optical system in the laser irradiation apparatus;

FIGS. 9A to 9C are drawings for describing a method for manufacturing a semiconductor device;

FIGS. 10A and 10B are drawings for describing a method for manufacturing a semiconductor device;

DETAILED DESCRIPTION OF THE INVENTION

Embodiment modes and embodiments of the present invention are hereinafter described with reference to drawings. Since the present invention can be embodied in many different modes, it is easily understood by those skilled in the art that the modes and the details of the present invention can be changed and modified in various ways unless such changes and modifications depart from the scope and the content of the present invention hereinafter defined. Therefore, the present invention is not limited to the description of the embodiment modes and the embodiments.

Embodiment Mode 1

In the present embodiment mode, a long-side of a linear beam is formed by using an off-axis cylindrical lens array and a converging lens for a long-side direction. The advantage of this optical system is that the distance from the converging lens for the long-side direction to an irradiation surface can be designed freely as described below.

Parameters of the off-axis cylindrical lens array and the converging lens constituting the optical system are described with reference to FIGS. 6A to 6C.

Figure 6A:
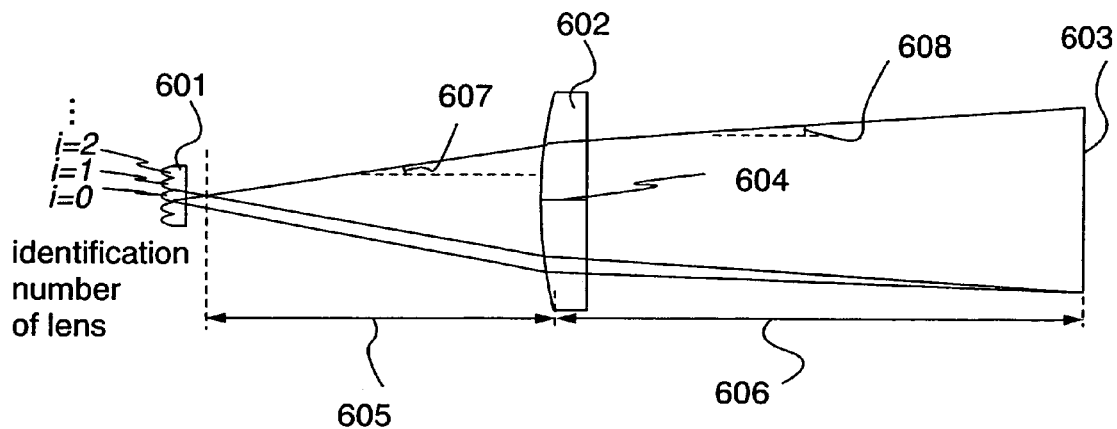
FIGS. 6A to 6C are drawings for describing parameters of the off-axis cylindrical lens array and the lens for converging the laser beam in a direction of a long side.

FIG. 6A is a drawing for describing an optical system of the present embodiment mode. In this figure, a laser beam is divided by an off-axis cylindrical lens array 601, the divided laser beams are converged by a lens 602 in a long-side direction, and the divided laser beams are superposed in the same region on an irradiation surface 603.

In this specification, n is the refractive index of the lens, i is an identification number of the lens in the off-axis cylindrical lens array 601 (the center lens in the array is i=0 and the identification number increases toward the ends of the array), r is the radius of curvature of the first surface of the off-axis cylindrical lens constituting the off-axis cylindrical lens array 601, m is the radius of curvature of the first surface of the lens 602, s is the center thickness 604 of the lens 602, L is the distance 605 from the focal point of the laser beam transmitted through the off-axis cylindrical lens array 601 to the lens 602, and g is the distance 606 from the lens 602 to the irradiation surface 603.

Figure 6B:
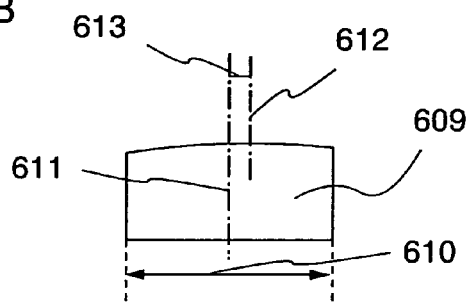
Figure 6C:
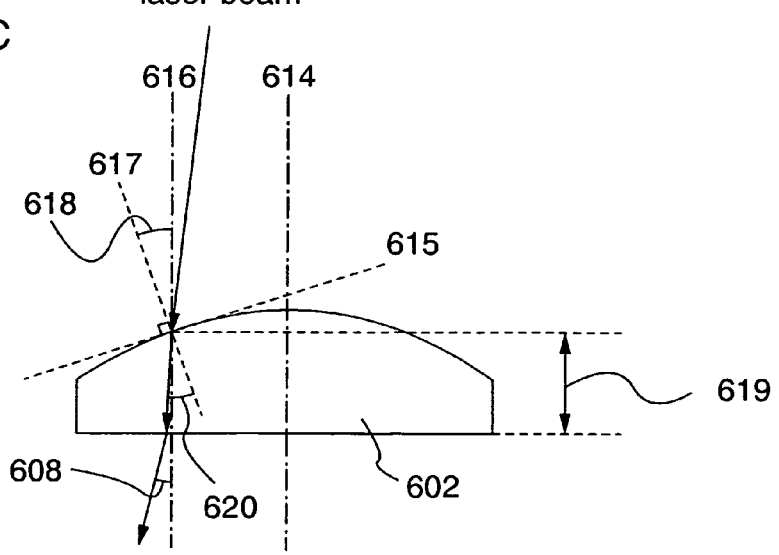

FIG. 6B shows the off-axis cylindrical lens constituting the off-axis cylindrical lens array 601. In this specification, d is the width 610 of a cylindrical lens 609 constituting the off-axis cylindrical lens array 601 in a direction of its curvature, $x_i$ is the displaced amount 613, which is the distance from the center axis 611 to the generating line 612 of the cylindrical lens 609.

It is necessary to optimize the above parameters when designing the optical system. To optimize the parameters, the traveling direction of the laser beam needs to be calculated. The distance 606 from the lens 602 to the irradiation surface 603 can be approximated as g from the following equation 1.

$$g = \frac{x_i - L(\tan\theta_{a0} - \tan\theta_{ai}) - \{p_0\tan(\theta_{c0} - \theta_{b0}) - p_i\tan(\theta_{ci} - \theta_{bi})\} + id}{\tan\theta_{d0} - \tan\theta_{di}}$$ [EQUATION 1]

Here, $\theta_{ai}$, which is an angle 607 between the laser beam divided by the off-axis cylindrical lens array 601 and the center axis of the off-axis cylindrical lens constituting the off-axis cylindrical lens array 601 (refer to FIG. 6A), can be obtained from the following equation 2.

$$\theta_{ai} = \arcsin\left(\frac{(d+x_i)\{4n^2r^2 - d^2\}^{\frac{1}{2}} - (4r^2 - d^2)^{\frac{1}{2}}}{4r^2}\right)$$ [EQUATION 2]

$\theta_{bi}$, which is an angle 618 between an axis 616 that is parallel to an optical axis 614 and that passes through the incident position of the laser beam on the lens 602 and a normal line 617 at the incident position of the laser beam on the lens 602, and $P_i$, which is the thickness 619 of the lens 602 at the incident position of the laser beam (refer to FIG. 6C), can be obtained from the following equations 3 and 4.

$$\theta_{bi} = \arcsin\left(\frac{L\tan\theta_{ai} + id + x_i}{m}\right)$$ [EQUATION 3]

$$p_i = s - m(1 - \cos\theta_{bi})$$ [EQUATION 4]

$\theta_{ci}$, which is an angle 620 between the laser beam traveling through the lens 602 and a normal line 617 (a line perpendicular to a tangent line 615 at the incident position of the laser beam) at the incident position of the laser beam on the lens 602, can be obtained from the following equation 5.

$$\theta_{ci} = \arcsin\left(\frac{\sin(\theta_{ai} + \theta_{bi})}{n}\right)$$ [EQUATION 5]

$\theta_{di}$, which is an angle 608 between the laser beam emitted from the lens 602 and the optical axis 614 of the lens 602, can be obtained from the following equation 6.

$$\theta_{di} = \arcsin(n\sin(\theta_{ci} - \theta_{bi}))$$ [EQUATION 6]

It is noted that the distance g is an approximate value when all the beams emitted from the respective lenses in the array are converged in the same region. The above equations can calculate the traveling direction of the laser beam when the off-axis cylindrical lens array is employed. By the above equations, the optical system having the desired function can be constituted.

Embodiment Mode 2

Figure 12:
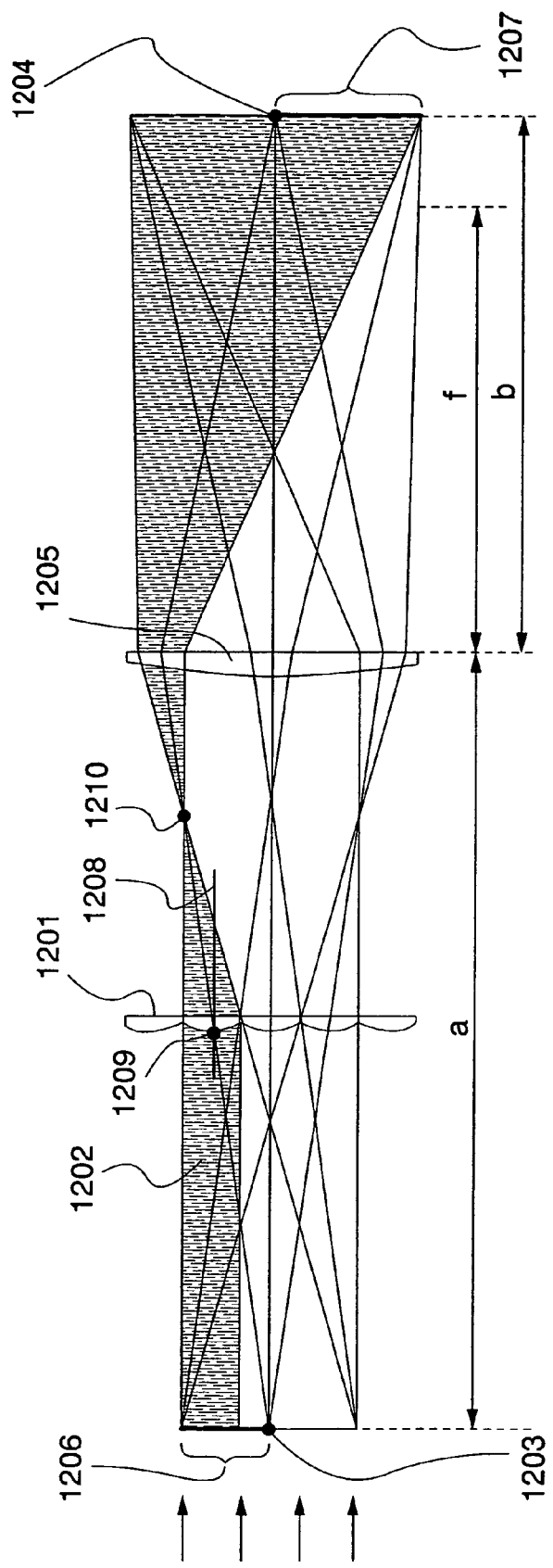
FIG. 12 is a drawing for describing a conjugate relation.

In the optical system of this embodiment mode, the irradiation surface (an imaging point) is conjugated with the hypothetical object point formed between the off-axis cylindrical lens array and the light source. Here, an example is described in which a parallel beam is incident into an off-axis cylindrical lens constituting an off-axis cylindrical lens array 1201 with reference to FIG. 12. It is noted that the parallel beam incident into the off-axis cylindrical lens is illustrated as a beam 1202. An intersection of a center axis 1208 of the off-axis cylindrical lens with a first surface of the off-axis cylindrical lens is illustrated as an intersection 1209. Here, a ray connecting the intersection 1209 with a focal point 1210 of the parallel beam formed between the off-axis cylindrical lens array 1201 and a converging lens 1205 for a long-side direction is extended to the side of the light source. When the rays from any two off-axis cylindrical lenses constituting the off-axis cylindrical lens array are extended to the side of the light source in the same way, the rays intersect at the object point 1203. The object point 1203 and the center position (an imaging point) 1204 of the irradiation surface are conjugated with respect to the converging lens 1205 for the long-side direction.

The optimum parameter in the optical design can be obtained even by the above relation. For example, an optical path when the parallel beam is incident into the off-axis cylindrical lens array 1201 is extended to the object point 1203 at the side of the light source. In this figure, the equation for image formation $1/f=1/a+1/b$ holds where a is the distance from the object point 1203 to the converging lens 1205, b is the distance from the converging lens 1205 to the irradiation surface, and f is the focal length of the converging lens 1205. Here, since the length of the beam formed hypothetically at the object point 1203 in the long-side direction is twice as high as an object height 1206, the ratio of the object height 1206 to a half length 1207 of the desired beam on the irradiation surface is a:b. Accordingly, it is possible to form the beam having the desired length on the irradiation surface by designing the optical system while using the above equation for image formation.

Embodiment 1

It is considered that the stripes appearing in parallel with the scanning direction of the laser beam mainly result from striae of the lens constituting the optical system or dust that is attached to the surface of the lens and burned by the laser irradiation. The inhomogeneous transmittance of the lens due to such an inhomogeneous region may cause the stripes. Moreover, when the rays divided to form the beam that is homogeneous in the long-side direction transmit through the region having the inhomogeneous transmittance, stripes may appear at regular intervals.

In order to suppress such stripes, the cylindrical lens array acting on the long-side direction of the linear beam is preferably set closer to the irradiation surface. In particular, it is preferable to set the cylindrical lens array for the long-side direction of the linear beam between the irradiation surface and the cylindrical lens array for homogenizing the linear beam in the short-side direction.

Here, as an example, a constitution is described in which the cylindrical lens array acting on the long-side direction of the beam is set closer to the irradiation surface. To obtain the desired beam length by the above constitution, it is necessary that each cylindrical lens in the cylindrical lens array acting on the long-side direction of the beam has the short focal length. However, when the cylindrical lens has the short focal length, the beam transmitted therethrough expands at a large angle. Here, in the case of using a doublet lens as a converging lens for the short-side direction, the ray of the laser beam is incident into the doublet lens at a large field angle. Since the field angle of the ray depends on a position in the lens where the ray transmits, the ray incident into the center portion of the irradiation surface in the long-side direction has the different focal length from the ray incident into the end portion of the irradiation surface. Accordingly, the beam shape in the short-side direction differs in the center portion and the end portion of the linear beam, and the homogeneous beam is difficult to be formed on the irradiation surface.

In addition, the large field angles of the rays affect adversely the energy distribution of the beam in the long-side direction. Moreover, when the cylindrical lens array acting on the long-side direction of the beam is set close to the irradiation surface, the intensity in the center portion of the linear beam in the long-side direction may be higher than the intensity in the end portion thereof. In the case of processing the semiconductor film, the fluctuation of the intensity of the beam in the long-side direction to the average value is preferably within the range of 1%. However, depending on the condition, the range of the fluctuation worsens to be approximately 10%. When the ray has the large field angle as above, the irradiation energy density differs in the center portion and the end portion of the beam in the long-side direction. Accordingly, it is impossible to process the whole surface of the substrate homogeneously.

In addition, the irradiation energy in which the stripes appearing in parallel with the long-side of the linear beam are not observed has a narrow margin. Therefore, when the beam has inhomogeneous energy distribution in the long-side direction, the irradiation energy cannot be kept in the range of the optimum margin to process the whole substrate. Accordingly, this causes another stripe to appear in the direction parallel to the long-side direction of the linear beam. For this reason, it is understood that the constitution in which the cylindrical lens array acting on the long-side direction of the beam is set closer to the irradiation surface cannot be achieved easily.

Figure 2A:
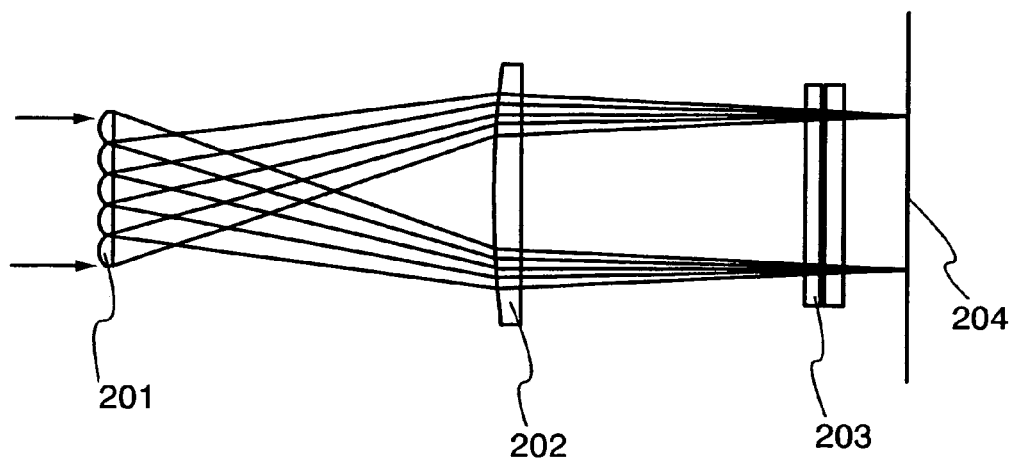
FIG. 2A is a drawing of an example of an optical system for suppressing the field angle of the ray.

Here, since the main factor that affects the energy distribution on the irradiation surface is considered to be the field angle, the ray is firstly expanded to the desired beam length by a cylindrical lens array 201 that has a short focal length and that acts on a long-side direction as shown in FIG. 2A. In the constitution shown in this figure, a cylindrical lens 202 for converging the laser beam in a long-side direction suppresses the field angle. With this constitution, the field angle of the ray incident into a doublet cylindrical lens 203 for converging the laser beam in the short-side direction can be made small. Moreover, in the constitution of FIGS. 2A and 2B, when the beams divided by the cylindrical lens array 201 are converged in the same region on the irradiation surface, the arrangement of the optical elements is limited because the distance from the cylindrical lens array 201 to the cylindrical lens 202 needs to be almost equal to the distance from the cylindrical lens 202 to the irradiation surface 204.

Figure 2B:
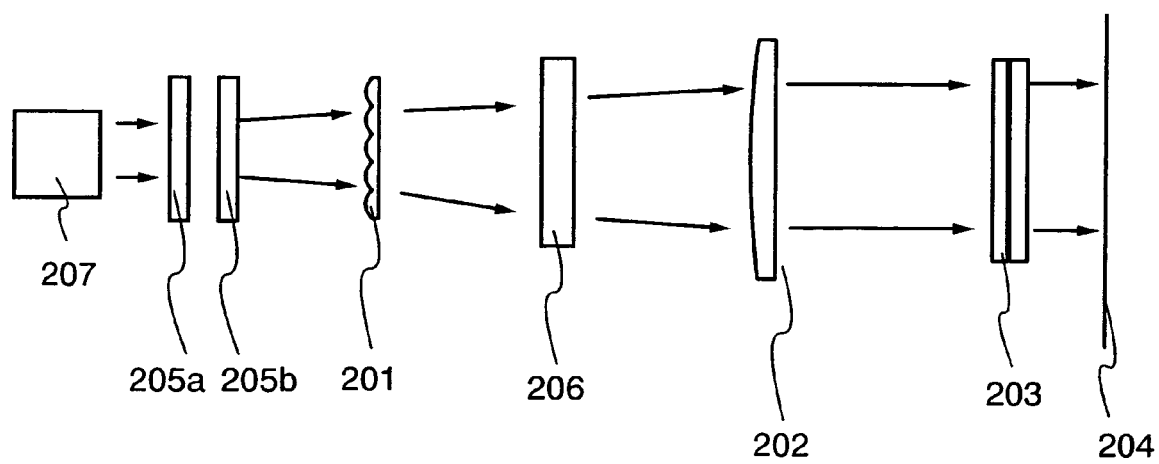
FIG. 2B is a drawing of an example of a laser irradiation apparatus for suppressing the field angle of the ray.

FIG. 2B shows an example of the typical arrangement of the optical system in the laser irradiation apparatus to suppress the effect of the field angle. A laser beam is oscillated from a laser oscillator 207 and delivered to the irradiation surface 204. In FIG. 2B, the cylindrical lens 202 is provided between the cylindrical lens 206 and the irradiation surface 204. The focal length of the cylindrical lens 202 is equal to the distance from the cylindrical lens 202 to the irradiation surface 204, and the cylindrical lens 202 has the curvature corresponding to its focal length. Accordingly, the thickness of the lens differs depending on the region where the laser beam transmits. For example, when a linear beam having a length of 300 mm is formed by using the cylindrical lens 202 having a radius of curvature of 500 mm, the thickness of the cylindrical lens 202 differs by approximately 40 mm in the center of the beam and in the end of the beam. Moreover, when the laser beams divided by the cylindrical lens arrays 205a and 205b acting on the short-side direction are converged by the cylindrical lens 206 so as to be homogenized, the laser beam travels having an angle in the plane including the optical axis and the short-side direction of the linear beam. Therefore, the difference in the optical path between the ray forming the center portion of the beam and the ray forming the end portion thereof in the long-side direction increases. Moreover, the difference in the focal length between the center portion of the beam and the end portion thereof increases.

When the cylindrical lens 202 is provided between the cylindrical lens 206 and the laser oscillator 207 differently from the optical system arrangement in FIG. 2B, the problem of the difference in the optical path due to the cylindrical lens 202 can be avoided. However, when considering the projecting magnification of the homogeneous plane formed by the cylindrical lens 206, and the imaging performance and the aperture size of the doublet cylindrical lens 203, the distance from the cylindrical lens 206 to the irradiation surface 204 is often as long as several meters. Therefore, when the cylindrical lens 202 is provided between the cylindrical lens 206 and the laser oscillator 207, the distance from the cylindrical lens 202 to the irradiation surface 204 is inevitably as long as several meters or more. Since the distance from the cylindrical lens array 201 to the irradiation surface 204 is necessary to be approximately twice as long as the distance from the cylindrical lens 202 to the irradiation surface 204, a footprint of the optical system increases remarkably.

As above, it is understood that the homogeneous laser irradiation is difficult to be performed when the cylindrical lens array acting on the long-side direction is set between the irradiation surface and the cylindrical lens array that homogenizes the energy distribution of the beam in the short-side direction. At present, the laser irradiation is often performed by arranging the optical elements so that the stripes are easily formed in order to secure homogeneity in the long-side direction.

According to this reason, an apparatus has been demanded which can process the whole surface of the substrate homogeneously by suppressing the stripes and securing the homogeneity of the linear beam in the long-side direction, and moreover, which can keep high efficiency of the laser energy.

Consequently, an optical system of a laser irradiation apparatus disclosed in the present embodiment is described with reference to FIGS. 3A and 3B.

First, a side view of FIG. 3B is described. A laser beam emitted from a laser oscillator 301 is propagated in a direction indicated by an arrow in FIGS. 3A and 3B. The laser beam is expanded by spherical lenses 302a and 302b. The constitution is not required when the laser oscillator 301 emits a sufficiently large beam spot.

A spot of the laser beam emitted from the laser oscillator 301 is divided in a short-side direction by cylindrical lens arrays 303a and 303b acting on the short-side direction. The cylindrical lens array 303a includes four cylindrical lenses arranged in a direction of curvature each of which has a first surface having a radius of curvature of +300 mm, a thickness of 6 mm, and a width of 8 mm. The cylindrical lens array 303b includes four cylindrical lenses arranged in a direction of curvature each of which has a first surface having a radius of curvature of −240 mm, a thickness of 6 mm, and a width of 8 mm. In addition, the distance between the cylindrical lens array 303a and the cylindrical lens array 303b is set to 185 mm. In addition, the sign of the radius of curvature is positive when the center of the curvature is at the side where the beam is emitted with respect to the lens surface. The sign is negative when the center of the curvature is at the side where the beam is incident with respect to the lens surface. In addition, the first surface is a surface into which the laser beam is incident, and the second surface is a surface from which the laser beam is emitted.

After that, the laser beam is converged by a cylindrical lens 306 that acts on the short-side direction and that is set at 888 mm from the cylindrical lens array 303b toward the irradiation surface. The cylindrical lens 306 has a thickness of 20 mm and a first surface having a radius of curvature of +486 mm. With this constitution, the rays transmitted from the lenses in the array are converged in the same region, and the homogenous plane is formed between the irradiation surface and the cylindrical lens 306. Thus, the energy distribution of the beam spot is homogenized in the short-side direction, and the linear beam having homogenous energy distribution can be formed by transferring the homogeneous plane to the irradiation surface.

In order for the beam to form the image, a doublet cylindrical lens 307 is arranged at 2080 mm from the cylindrical lens 306 toward the irradiation surface. The doublet cylindrical lens 307 is a set of lenses consisting of two cylindrical lenses 307a and 307b. One of the two cylindrical lenses constituting the doublet cylindrical lens 307 has a thickness of 10 mm, a first surface having a radius of curvature of +125 mm, and a second surface having a radius of curvature of +77 mm. The other has a thickness of 20 mm, a first surface having a radius of curvature of +97 mm, and a second surface having a radius of curvature of −200 mm. The distance between these two lenses is 5.5 mm. With this constitution, the energy distribution of the laser beam spot is homogenized in the short-side direction, and the length of the beam spot in the short-side direction is determined. Although the doublet cylindrical lens may not be used, the doublet cylindrical lens can provide a spatial margin because enough distance can be secured between the optical system and the irradiation surface. The rays are converged on the irradiation surface 308 set at 235 mm behind the doublet cylindrical lens. This can form the beam having homogeneous energy distribution in the short-side direction.

Figure 4:
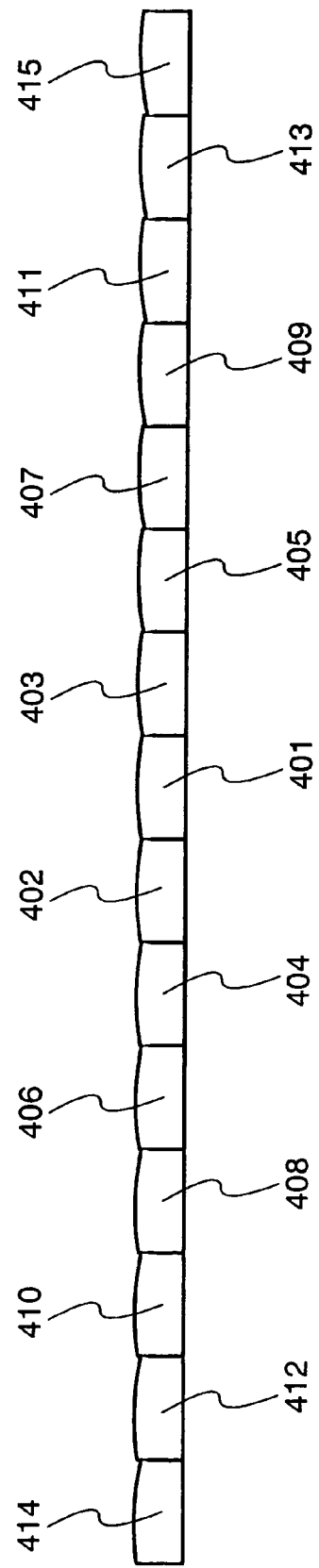
FIG. 4 is a drawing for showing an off-axis cylindrical lens array.

Next, a top view of FIG. 3A is described. The laser beam emitted from the laser oscillator 301 is divided in the long-side direction by a cylindrical lens array 304 acting on the long-side direction. The cylindrical lens array 304 includes 15 cylindrical lenses arranged in the direction of curvature each of which has a first surface having a radius of curvature of +19 mm, a thickness of 5 mm, and a width of 6.5 mm. FIG. 4 is a top view of the cylindrical lens array 304. A cylindrical lens 401 in the center of the cylindrical lens array 304 is a normal cylindrical lens which is symmetric along the generating line. However, each of the other 14 cylindrical lenses is asymmetric along the generating line. The cylindrical lenses 402 and 403 are manufactured so that their generating lines are displaced by 0.2 mm to the outside from the center line of the lens in the direction of its width. In the same way, the generating lines of the cylindrical lenses 404 and 405 are displaced by 0.3 mm to the outside from the center line in the direction of the width, the generating lines of the cylindrical lenses 406 and 407 are displaced by 0.4 mm to the outside from the center line in the direction of the width, the generating lines of the cylindrical lenses 408 and 409 are displaced by 0.5 mm to the outside from the center line in the direction of the width, the generating lines of the cylindrical lenses 410 and 411 are displaced by 0.6 mm to the outside from the center line in the direction of the width, the generating lines of the cylindrical lenses 412 and 413 are displaced by 0.7 mm to the outside from the center line in the direction of the width, and the generating lines of the cylindrical lenses 414 and 415 are displaced by 0.8 mm to the outside from the center line in the direction of the width. As thus described, the displaced amount between the generating line and the center line of the lens increases toward opposite ends of the array from the center of the array. The traveling direction of the ray can be freely controlled by displacing the generating line of the lens from the center line of the lens in the direction of its width. With the above constitution, the rays transmitted through the cylindrical lens array 304 and a cylindrical lens 305 converging in the long-side direction can be converged in the same region.

After that, the laser beams are combined into one beam on the irradiation surface 308 by the cylindrical lens 305 for converging the laser beam in the long-side direction. The cylindrical lens 305 has a first surface having a radius of curvature of +660 mm and a thickness of 50 mm and is set at 740 mm from the cylindrical lens array 304 toward the irradiation surface. With this constitution, the energy distribution of the beam spot is homogenized in the long-side direction, and the length of the beam spot in the long-side direction is determined. Here, since the cylindrical lenses constituting the cylindrical lens array 304 have the displaced amount as described above, the loss of the beam, which occurs when using the normal cylindrical lens array not having the displaced amount, can be decreased.

With the above constitution, the cylindrical lens array 304 can be set between the irradiation surface and the cylindrical lens array 303. Moreover, the cylindrical lens 305 can be set between the laser oscillator and the cylindrical lens 306. This embodiment using the cylindrical lens array 304 and the cylindrical lens 305 has the following advantages. One is that the field angle of the ray, which causes the inhomogeneous energy distribution of the linear beam in the long-side direction on the irradiation surface in the conventional optical system, can be made small. Another is that the energy usage efficiency can be enhanced.

Figure 5A:
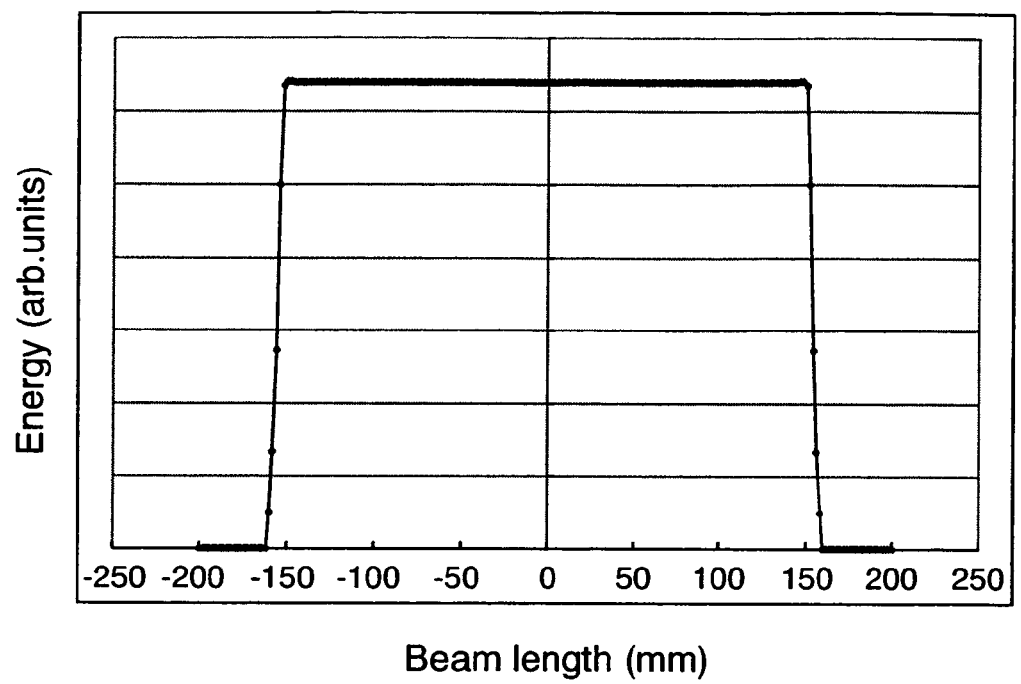
FIGS. 5A and 5B are drawings for showing energy distribution of the laser beam.
Figure 5B:
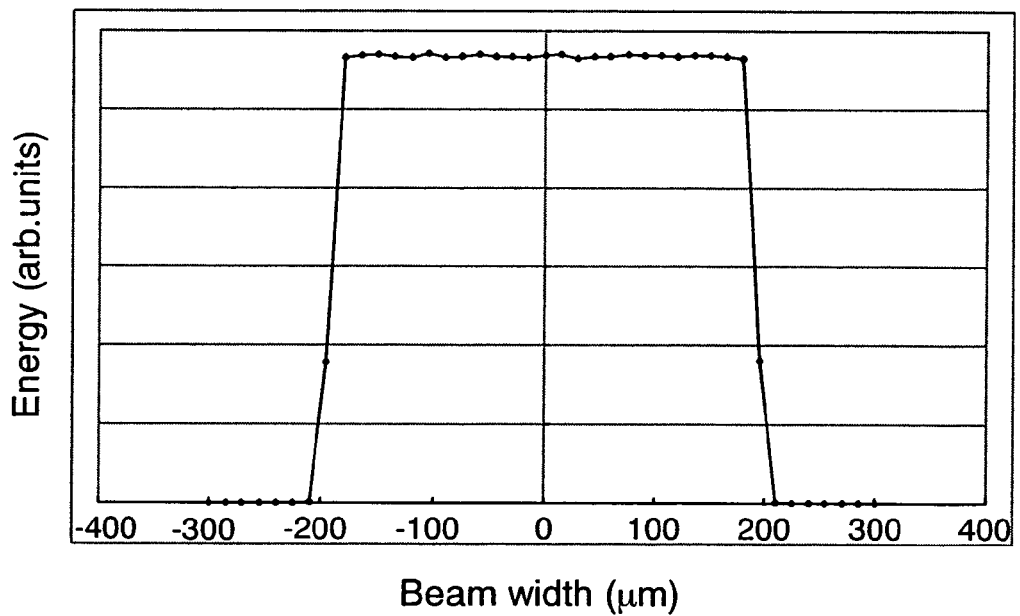

FIGS. 5A and 5B show results of simulation by optical design software. The linear beam formed in this simulation has homogeneous energy distribution, a length of 300 mm in the long-side direction, and a length of 0.4 mm in the short-side direction. FIG. 5A shows the energy distribution of the linear beam in the long-side direction. The fluctuation to the average value of the intensity of the beam in the long-side direction is within the range of 0.5% (the horizontal axis is in the range of −150 to +150 mm). In addition, FIG. 5B shows the energy distribution of the linear beam in the short-side direction. It is understood that the homogeneous beam that is more homogeneous than the beam shown in FIG. 5 is formed on an irradiation surface.

It is preferable that the laser oscillator to be used in combination with the optical system of this embodiment has high output power and a wavelength well absorbed in the semiconductor film. In the case of using a silicon film as the semiconductor film, the laser beam preferably has a wavelength of 600 nm or less in consideration of the absorption coefficient. As the laser oscillator for emitting such a laser beam, an excimer laser, a YAG laser (harmonic), and a glass laser (harmonic) are given.

Moreover, as the laser oscillator for emitting the laser beam having appropriate wavelengths to crystallize the silicon film, there are a $YVO_4$ laser (harmonic), a YLF laser (harmonic), an Ar laser, and a $GdVO_4$ laser (harmonic), for example.

Embodiment 2

This embodiment describes a method for manufacturing a semiconductor device by using the laser irradiation apparatus shown in the embodiment 1. First, a glass substrate (AN 100) having a size of 600×720×0.7 mm is prepared. This substrate can resist the temperature up to 600° C. A silicon oxide film is formed in 200 nm thick over the glass substrate as a base film. Then, an amorphous silicon film is formed thereover in 55 nm thick. The films are formed by a sputtering method. A plasma CVD method may be employed alternatively.

The substrate with the above films formed thereover is set in a nitrogenous atmosphere of 450° C. This process is to decrease the density of hydrogen in the amorphous silicon film. This process is performed because the film cannot resist the laser energy when the film contains too much hydrogen. The density of hydrogen in the film is appropriate on the order of $10^{20}/cm^3$. $10^{20}/cm^3$ means $10^{20}$ number of hydrogen atoms exist per 1 $cm^3$.

The laser oscillator employed in this embodiment is STEEL 1000 XeCl excimer laser manufactured by Lambda Physik, Inc. The excimer laser is a pulsed laser. This excimer laser has the maximum output power of 1000 mJ per a pulse, an oscillation wavelength of 308 nm, and the maximum repetition rate of 300 Hz. When the energy of the pulsed laser beam fluctuates within ±10%, preferably within ±5%, per each pulse during the laser processing to one substrate, it is possible to perform homogeneous crystallization.

The fluctuation of the laser energy described above is defined as follows. The average value of the laser energy in the period of the irradiation to one substrate is assumed to be standard. Then, the fluctuation of the laser energy is defined as the value expressing the difference between the average value and the minimum value in the period of the irradiation or the difference between the average value and the maximum value in the period of the irradiation in percentage terms.

The laser beam is delivered, for example, in such a way that a stage with the irradiation surface mounted thereover is scanned in the short-side direction of the rectangular shape. On this occasion, a practitioner may determine the energy density of the beam spot on the irradiation surface and the scanning speed appropriately. The energy density is appropriate in the range of 200 to 1000 $mJ/cm^2$ (preferably 300 to 600 $mJ/cm^2$) It is feasible to perform laser annealing homogeneously when the scanning speed is selected in the range where the width of the rectangular beam spot in the short-side direction is overlapped one another by approximately 90% or more. The optimum scanning speed depends on the pulse repetition rate of the laser oscillator, and it may be regarded that the optimum scanning speed is proportional to the pulse repetition rate thereof.

Thus, the laser annealing step is completed. By repeating the above step, many substrates can be processed. With this substrate, for example an active matrix liquid crystal display device and an EL display device can be manufactured by a known method.

In the above example, the excimer laser is used as the laser oscillator. Since the excimer laser has coherent length as short as several μm, the excimer laser is suitable to the above optical system. Although the lasers described below may have the long coherent length, the laser whose coherent length is changed intentionally may be used. It is also preferable to use the harmonic of the YAG laser or the harmonic of the glass laser because output power as high as that of the excimer laser can be obtained and the energy of the laser beam is sufficiently absorbed in the silicon film. As the laser oscillator appropriate for the crystallization of the silicon film, the $YVO_4$ laser (harmonic), the YLF laser (harmonic), the Ar laser, the $GdVO_4$ laser (harmonic), and the like are given. The wavelengths of these laser beams are sufficiently absorbed in the silicon film.

Although the present embodiment uses the amorphous silicon film as the non-single crystal semiconductor film, it is easily supposed that the laser irradiation apparatus shown in the embodiment 1 can be applied to another non-single crystal semiconductor. For example, a chemical compound semiconductor film having an amorphous structure such as an amorphous silicon germanium film may be used as the non-single crystal semiconductor film. Moreover, the poly-crystalline silicon film may be used as the non-single crystal semiconductor film.

Embodiment 3

The present embodiment describes a method for manufacturing a display device with reference to FIGS. 7A to 10B. In the method for manufacturing a display device described in this embodiment, a TFT for a pixel portion and a TFT for a driver circuit portion provided to its periphery are manufactured simultaneously. However, to simplify the description, a CMOS circuit, which is a basic unit of the driver circuit, is illustrated.

Figure 7A:
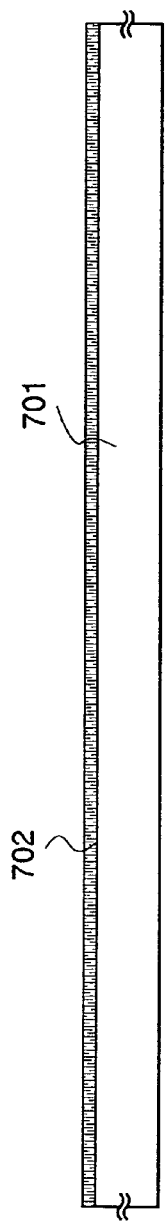
FIGS. 7A to 7E are drawings for describing a method for manufacturing a semiconductor device.

First, as shown in FIG. 7A, a substrate 701 with a base film (not shown) provided thereover is prepared. In this embodiment, the base film is a multilayer of a silicon nitride oxide film having a thickness of 100 nm and a silicon oxide film having a thickness of 200 nm. In this case, the density of nitrogen is preferably in the range of 10 to 25 wt %. Alternatively, a semiconductor film may be directly formed over a quartz substrate without providing the base film.

Next, an amorphous silicon film 702 is formed in 45 nm thick over the substrate 701 by a known method. It is noted that not only the amorphous silicon film but also another semiconductor film having the amorphous structure (including a microcrystal semiconductor) may be employed. Moreover, the chemical compound semiconductor film including the amorphous structure such as the amorphous silicon germanium film may be used.

Subsequently, the amorphous silicon film 702 is crystallized by a laser crystallization method. The laser crystallization may be performed by using the laser irradiation apparatus shown in the embodiment 1. The laser crystallization method may be performed in combination with a thermal crystallization method using RTA or annealing furnace or with a thermal crystallization method using a metal element for promoting the crystallization.

Figure 7B:
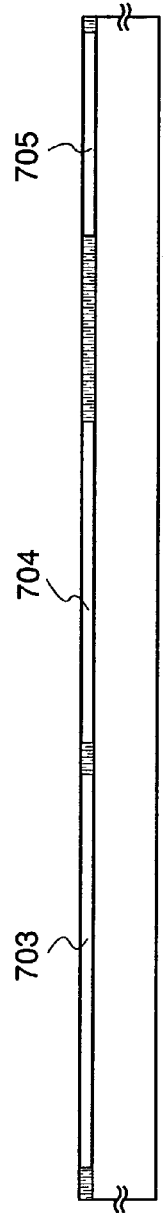

According to the laser crystallization as above, crystallized regions 703, 704, and 705 are formed partially in the amorphous semiconductor film (FIG. 7B).

Figure 7C:
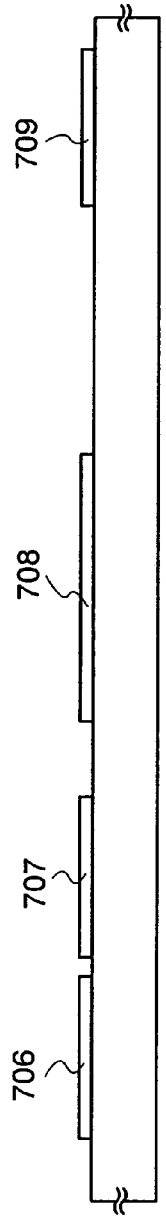

Next, the crystalline semiconductor film in which the crystallinity is enhanced is patterned partially into a desired shape, and island-shaped semiconductor films 706 to 709 are formed from the crystallized regions 703, 704, and 705 (FIG. 7C).

Figure 7D:
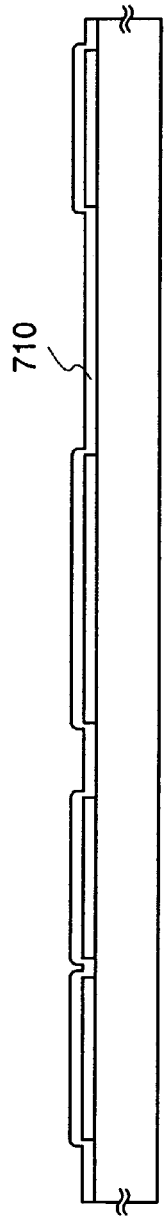

Subsequently, as shown in FIG. 7D, a gate insulating film 710 is formed so as to cover the island-shaped semiconductor films 706 to 709. The gate insulating film 710 is formed of an insulating film including silicon by the plasma CVD method or the sputtering method and has a thickness of 40 to 150 nm. In this embodiment, the silicon oxynitride film (composition rate: Si=32%, O=59%, N=7%, H=2%) is formed in 110 nm thick by the plasma CVD method. The gate insulating film is not limited to the silicon oxynitride film, and another insulating film including silicon may be formed in a single layer or a multilayer.

In the case of using the silicon oxide film, it can be formed by the plasma CVD method under the condition where TEOS (tetraethyl orthosilicate) is mixed with $O_2$, the reaction pressure is 40 Pa, the substrate temperature ranges from 300 to 400° C., and the electricity is discharged at electric density from 0.5 to 0.8 W/cm$^2$ with high frequency (13.56 MHz). The silicon oxide film formed thus can obtain good characteristic as the gate insulating film by the thermal annealing at 400 to 500° C. performed thereafter.

Figure 7E:
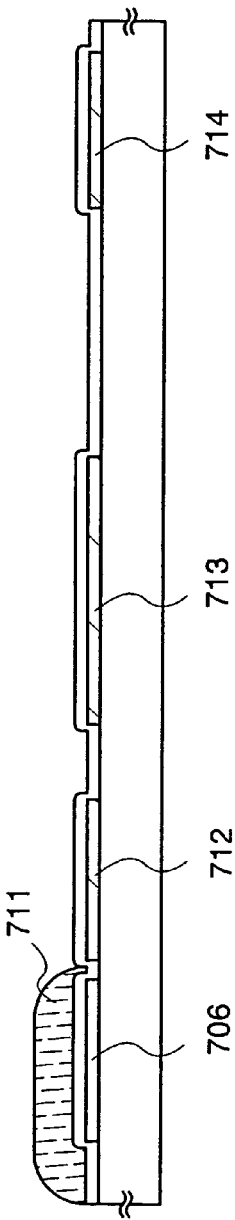

Next, as shown in FIG. 7E, a resist mask 711 is formed, and an impurity element imparting p-type (hereinafter referred to as a p-type impurity element) is added through the gate insulating film 710. As the p-type impurity element, mainly a 13th element typified by boron or gallium can be used. This step (referred to as a channel-doping step) is to control the threshold voltage of the TFT.

In this embodiment, boron is added by an ion doping method in which diborane ($B_2H_6$) is excited to be plasma without mass separation. Moreover, an ion injection method which performs the mass separation may be employed. According to this step, impurity regions 712 to 714 each including boron at density of $1\times10^{15}$ to $1\times10^{18}$ atoms/cm$^3$ (typically $5\times10^{16}$ to $5\times10^{17}$ atoms/cm$^3$) are formed.

Figure 8A:
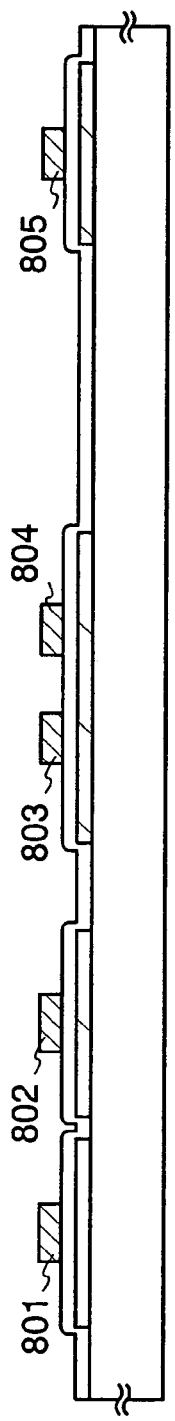
FIGS. 8A to 8C are drawings for describing a method for manufacturing a semiconductor device.

Next, a conductive film is formed in 200 to 400 nm thick and patterned so as to form gate electrodes 801 to 805 (FIG. 8A). Although the gate electrode may be a single conductive film, the gate electrode is preferably a multilayer including, for example, two or three layers according to the need. A known conductive material can be used as the material of the gate electrode.

Specifically, the conductive film may be formed of an element selected from a group consisting of tantalum (Ta), titanium (Ti), molybdenum (Mo), tungsten (W), chromium (Cr), and silicon (Si) which has electrical conductivity. Moreover, the conductive film may be formed of nitride of the above elements (typically a tantalum nitride film, a tungsten nitride film, or a titanium nitride film), alloy in which the above elements are combined (typically Mo—W alloy or Mo—Ta alloy), or silicide of the above elements (typically a tungsten silicide film or a titanium silicide film). The conductive film may be a single layer or a multilayer.

In this embodiment, the multilayer including a tungsten nitride (WN) film having a thickness of 50 nm and a tungsten (W) film having a thickness of 350 nm is employed. This multilayer may be formed by the sputtering method. When the inert gas such as Xe or Ne is added as the sputtering gas, it is possible to prevent the film from being stripped due to the stress.

Figure 8B:
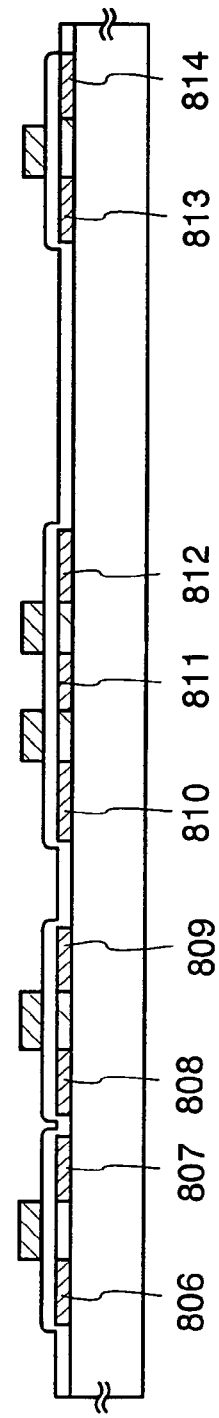

Next, as shown in FIG. 8B, an n-type impurity element (phosphorus in this embodiment) is added in a self-aligning manner by using the gate electrodes 801 to 805 as the mask. It is preferable that the impurity regions 806 to 814 include phosphorous at density of $1\times10^{16}$ to $5\times10^{18}$ atoms/cm$^3$ (typically $3\times10^{17}$ to $3\times10^{18}$ atoms/cm$^3$).

Figure 8C:
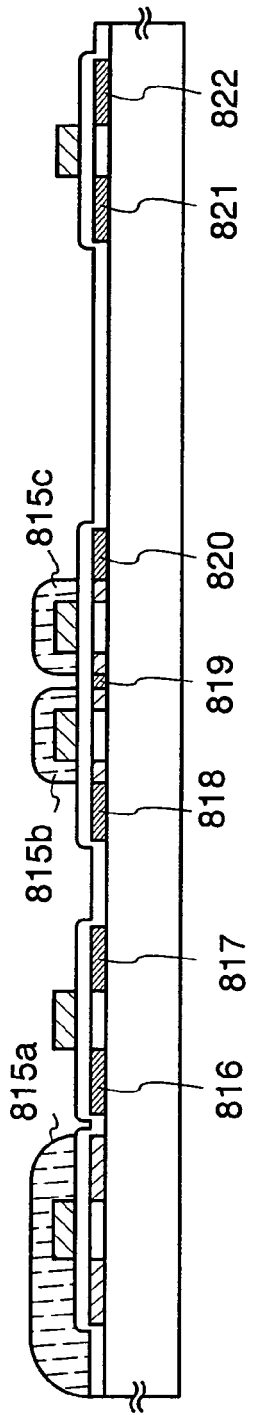

Then, as shown in FIG. 8C, resist masks 815a to 815c are formed so as to cover the gate electrodes, and impurity regions 816 to 822 including the n-type impurity element (phosphorus in this embodiment) at high density are formed by adding phosphorous. In this embodiment, phosphorus is added by the ion doping method so that the density of phosphorus ranges from $1\times10^{20}$ to $1\times10^{21}$ atoms/cm$^3$ (typically $2\times10^{20}$ to $5\times10^{21}$ atoms/cm$^3$).

Although a source region or a drain region of an n-channel TFT is formed by this step, a part of n-type impurity regions 810 to 812 that are formed in the step of FIG. 8B is left for a switching TFT. These regions to be left are LDD regions of the switching TFT.

Next, as shown in FIG. 9A, the resist mask 815a to 815c are removed and a new resist mask 901 is formed. Then, a p-type impurity element (boron in this embodiment) is added to form impurity regions 902 and 903 that include boron at high density. Here, boron is added by the ion doping method using diborane ($B_2H_6$) so that the density of boron ranges from $3\times10^{20}$ to $3\times10^{21}$ atoms/cm$^3$ (typically $5\times10^{20}$ to $1\times10^{21}$ atoms/cm$^3$).

Although the impurity regions 902 and 903 already include phosphorus at density from $1\times10^{20}$ to $1\times10^{21}$ atoms/cm$^3$, boron is added here at density three times higher than the above density. For this reason, the n-type impurity region formed in advance is inverted to be p-type totally and serves as a p-type impurity region.

Next, as shown in FIG. 9B, after removing the resist mask 901, a first interlayer insulating film 904 is formed. The first interlayer insulating film 904 can be formed of an insulating material including silicon. In this embodiment, a silicon oxynitride film having a thickness of 150 nm is formed by the plasma CVD method.

After that, the n-type or p-type impurity elements added at the respective densities are activated. The laser annealing method is employed in the activation process. In the case of using the laser annealing method, the laser used in the crystallization can be used. For the activation, the energy density as high as or a little lower than that in the crystallization, which is 100 to 1000 mJ/cm$^2$ (preferably 300 to 600 mJ/cm$^2$), is necessary.

Moreover, the activation process may be performed before forming the first interlayer insulating film 904.

Moreover, a hydrogenation process is performed by performing heat treatment at 300 to 450° C. for 1 to 12 hours in the atmosphere including hydrogen by 3 to 100%. This process is to terminate the dangling bond of the semiconductor films by using hydrogen excited thermally. As another means for the hydrogenation, plasma hydrogenation (by using hydrogen that is excited to be plasma) may be performed.

It is noted that the hydrogenation process may be performed while the first interlayer insulating film 904 is formed. Specifically, after forming a silicon nitride oxide film having a thickness of 200 nm, the hydrogenation process as above may be performed, and then a silicon oxide film having a thickness of 800 nm may be performed.

Next, a second interlayer insulating film 905 is formed of an organic insulating material or an inorganic insulating material over the first interlayer insulating film 904. In this embodiment, the second interlayer insulating film 905 is formed of acrylic resin in 1.6 μm thick, and then a third interlayer insulating film (not shown) is formed. This third interlayer insulating film is effective in preventing the second interlayer insulating film entering an organic light-emitting layer to be formed afterward.

Next, as shown in FIG. 9C, a contact hole is formed to the first interlayer insulating film 904, the second interlayer insulating film 905, and the third interlayer insulating film (not shown), and source and drain wirings 906 to 912 are formed. In this embodiment, the electrode is formed of a multilayer including three layers of a Ti film having a thickness of 100 nm, an aluminum film including Ti having a thickness of 300 nm, and a Ti film having a thickness of 150 nm that are formed continuously by the sputtering method. Another conductive film may be also employed.

Next, a pixel electrode 1001 is formed so as to contact the drain wiring 911. The pixel electrode 1001 is formed by patterning a transparent conductive film. The pixel electrode 1001 serves as an anode of a light-emitting element. The transparent conductive film may be, for example, a compound of indium oxide and tin oxide, a compound of indium oxide and zinc oxide, zinc oxide, tin oxide, or indium oxide.

After forming the pixel electrode, a bank 1002 is formed of a resin material. The bank 1002 is formed by patterning an acrylic film or a polyimide film having a thickness of 1 to 2 μm so as to expose a part of the pixel electrode 1001. It is preferable to form a black film, which becomes a shielding film (not shown), under the bank 1002.

Next, an EL layer 1003 and a cathode (MgAg electrode) 1004 are continuously formed by a vacuum evaporation method without releasing the substrate to the air. The thickness of the EL layer 1003 may range from 80 to 200 nm (typically from 100 to 120 nm), and the thickness of the cathode 1004 may range from 180 to 300 nm (typically 200 to 250 nm).

In this step, the EL layer and the cathode are formed sequentially to a pixel corresponding to red, a pixel corresponding to green, and a pixel corresponding to blue. However, since the EL layer does not have enough resistance against the solution, it is necessary to form each color separately without using a photolithography technique. Consequently, pixels except the desired pixel are preferably covered by a metal mask so that the EL layer and the cathode are formed selectively only in a necessary part.

Specifically, a mask for covering all the pixels except the pixel corresponding to red is provided, and the cathode and the EL layer for emitting red color are selectively formed by using the mask. Next, a mask for covering all the pixels except the pixel corresponding to green is provided, and the cathode and the EL layer for emitting green color are selectively formed by using the mask. Subsequently, a mask for covering all the pixels except the pixel corresponding to blue is provided, and the cathode and the EL layer for emitting blue color are selectively formed by using the mask. Although these masks are all different in this description, the same mask can be used to all the pixels. Moreover, it is preferable to process while keeping the vacuum atmosphere until forming the EL layer and the cathode to all the pixels.

The EL layer 1003 can be formed of a known material. The known material is preferably an organic material when considering the drive voltage. For example, the EL layer may include four layers of a hole-injecting layer, a hole-transporting layer, a light-emitting layer, and an electron-injecting layer. Although this embodiment shows an example of using the MgAg electrode as the cathode of the EL element, another known material may be used.

A light-emitting element 1005 is completed when the cathode 1004 is formed. After that, a protective film 1006 is formed so as to cover the light-emitting element 1005 completely. An insulating film including a carbon film, a silicon nitride film, or a silicon nitride oxide film can be used as the protective film 1006 in a single layer or a multilayer.

A sealing material 1007 is provided so as to cover the protective film 1006, and a cover member 1008 is pasted thereto. The sealing material 1007 is a UV curable resin, and it is preferable to use a material having moisture absorption property or oxidation prevention property inside. In this embodiment, a glass substrate, a quartz substrate, or a plastic substrate can be used as the cover member 1008.

Thus, an active matrix EL display device having a p-channel TFT 1009, an n-channel TFT 1010, a switching TFT 1011, and a current-controlling TFT 1012 that is shown in FIG. 10B is completed. The laser irradiation apparatus of the present invention can be used not only to manufacture the display device having such a structure but also to manufacture various display devices. Moreover, the laser irradiation apparatus shown in the embodiment 1 can be used not only to crystallize the semiconductor film but also to expose the resist in the lithography process for forming the resist mask.

Embodiment 4

A semiconductor device (particularly a display device such as a liquid crystal display device or an EL display device) manufactured by using the laser irradiation apparatus shown in the embodiment 1 can be applied to various electronic instruments. As examples of the electronic instruments to which the semiconductor device can be applied, there are a television device, a video camera, a digital camera, a goggle-type display (head mount display), a navigation system, a sound reproduction device (a car audio, an audio component), a personal computer, a game machine, a portable information terminal (a mobile computer, a mobile phone, a mobile game machine, or an electronic book), an image reproduction device with a recording medium equipped (specifically a device reproducing a recording medium such as a digital versatile disc (DVD) and having a display for displaying its image), and the like. These examples are illustrated in FIGS. 11A to 11H.

Figure 11A:
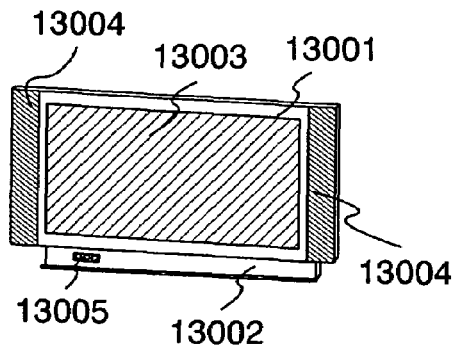
FIGS. 11A to 11H are drawings of examples of the electronic instruments with the semiconductor device equipped.

FIG. 11A is a television device including a chassis 13001, a supporting stand 13002, a display portion 13003, a speaker portion 13004, a video input terminal 13005, and the like. The laser irradiation apparatus shown in the embodiment 1 can be used to process the display portion 13003 and to complete the television device. The display portion 13003 may be an EL display or a liquid crystal display. Moreover, the television device includes all the television devices for a computer, television broadcasting reception, advertisement, and the like.

Figure 11B:
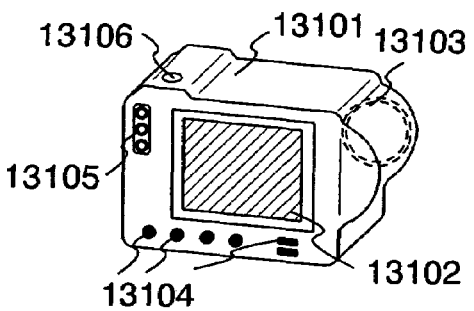

FIG. 11B is a digital camera including a main body 13101, a display portion 13102, a image reception portion 13103, an operation key 13104, an external connection port 13105, a shutter 13106, and the like. The laser irradiation apparatus shown in the embodiment 1 can be used to process the display portion 13102 and the like and to complete the digital camera.

Figure 11C:
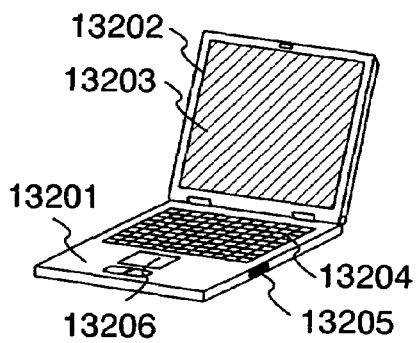

FIG. 11C is a computer including a main body 13201, a chassis 13202, a display portion 13203, a keyboard 13204, an external connection port 13205, a pointing mouse 13206, and the like. The laser irradiation apparatus shown in the embodiment 1 can be used to process the display portion 13203 and the like and to complete the computer.

Figure 11D:
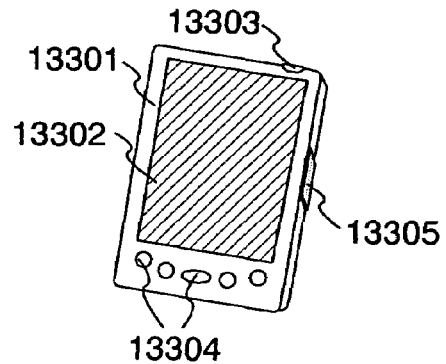

FIG. 11D is a mobile computer including a main body 13301, a display portion 13302, a switch 13303, an operation key 13304, an infrared port 13305, and the like. The laser irradiation apparatus shown in the embodiment 1 can be used to process the display portion 13302 and the like and to complete the mobile computer.

Figure 11E:
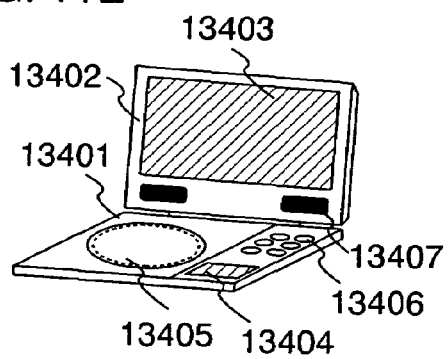

FIG. 11E is an image reproduction device with a recording medium equipped (specifically a DVD reproduction device) including a main body 13401, a chassis 13402, a display portion A13403, a display portion B13404, a recording medium (such as DVD) reading portion 13405, an operation key 13406, a speaker portion 13407, and the like. The display portion A13403 mainly displays information with an image, and the display portion B13404 displays information with a letter. The laser irradiation apparatus shown in the embodiment 1 can be used to process the display portion A13403, the display portion B13404, and the like and to complete the image reproduction device. The image reproduction device with the recording medium equipped includes a game machine and the like.

Figure 11F:
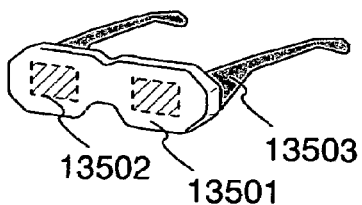

FIG. 11F a goggle-type display (head mount display) including a main body 13501, a display portion 13502, an arm portion 13503, and the like. The laser irradiation apparatus shown in the embodiment 1 can be used to process the display portion 13502 and the like and to complete the goggle type display.

Figure 11G:
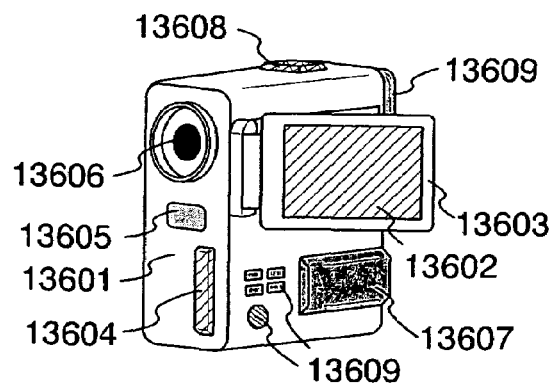

FIG. 11G is a video camera including a main body 13601, a display portion 13602, a chassis 13603, an external connection port 13604, a remote controller receiving portion 13605, an image receiving portion 13606, a battery 13607, a sound input portion 13608, an operation key 13609, and the like.

The laser irradiation apparatus shown in the embodiment 1 can be used to process the display portion 13602 and the like and to complete the video camera.

Figure 11H:
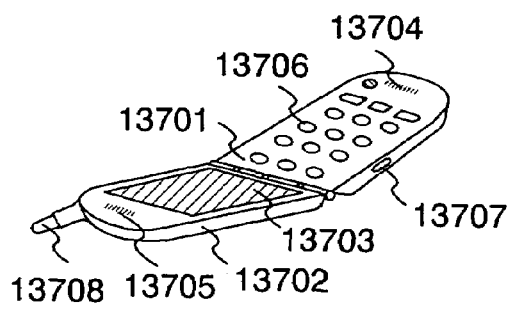

FIG. 11H is a mobile phone including a main body 13701, a chassis 13702, a display portion 13703, a sound input portion 13704, a sound output portion 13705, an operation key 13706, an external connection port 13707, an antenna 13708, and the like. The laser irradiation apparatus shown in the embodiment 1 can be used to process the display portion 13703 and the like and to complete the mobile phone. When the display portion 13703 displays a white letter on a black background, the power consumption of the mobile phone can be suppressed.

The display device used in the display portion of these electronic instruments has a thin film transistor for driving the pixel. The laser irradiation apparatus shown in the embodiment 1 can be used to crystallize the semiconductor film used for the thin film transistor Moreover, when the display device for the display portion in the electronic instrument requires high definition and high characteristic as the EL display device, the electronic instrument having the display portion in which the display unevenness is reduced can be manufactured by crystallizing the semiconductor film with the use of the laser irradiation apparatus shown in the embodiment 1.

As thus described, the semiconductor device manufactured by the laser irradiation apparatus shown in the embodiment 1 can be applied in a wide range and used in the electronic instruments in every field.

Embodiment 5

This embodiment shows a result of obtaining the beam having more homogeneous energy distribution by the laser irradiation apparatus of the present invention.

Table 1 is data showing the measured value of power of the linear beam in the long-side direction that is obtained by the laser irradiation apparatus of the present invention.

TABLE 1

| measured point | front −135 | −70 | center 0 | 70 | back 135 | average |
|---|---|---|---|---|---|---|
| energy [mJ/3 cm] | 74.4 | 74.5 | 75.1 | 74.6 | 74.7 | 74.66 |
| energy [%] | −0.35 | −0.21 | 0.59 | −0.08 | 0.05 | 0.94 |

Figure 13A:
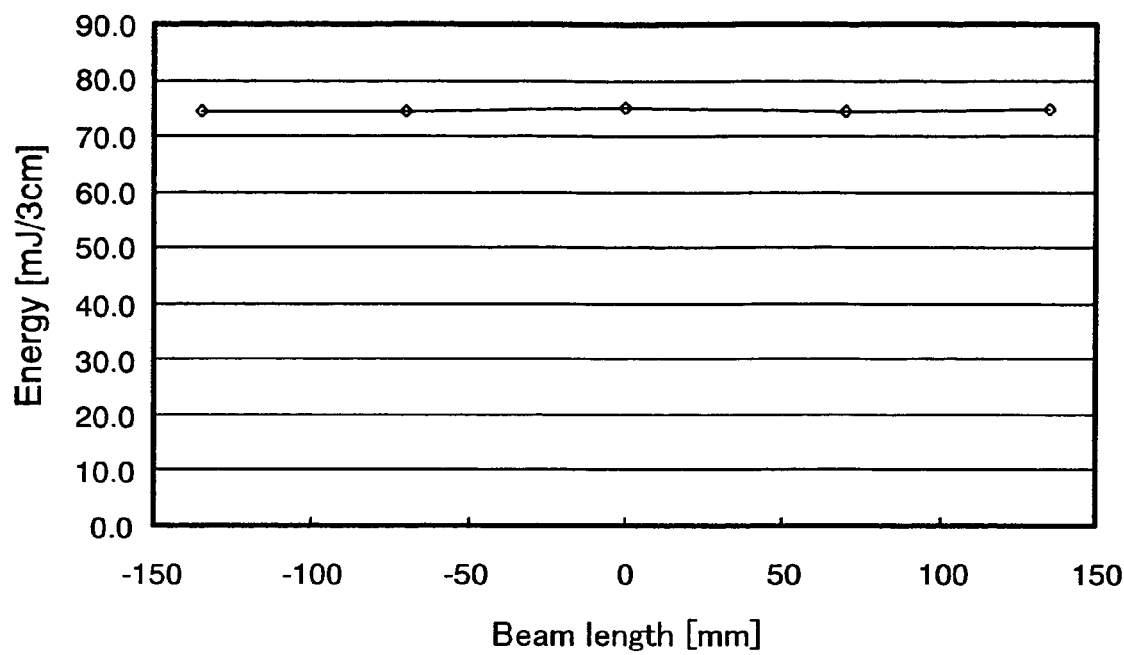
FIGS. 13A and 13B are drawings for showing the energy distribution of the laser light.
Figure 13B:
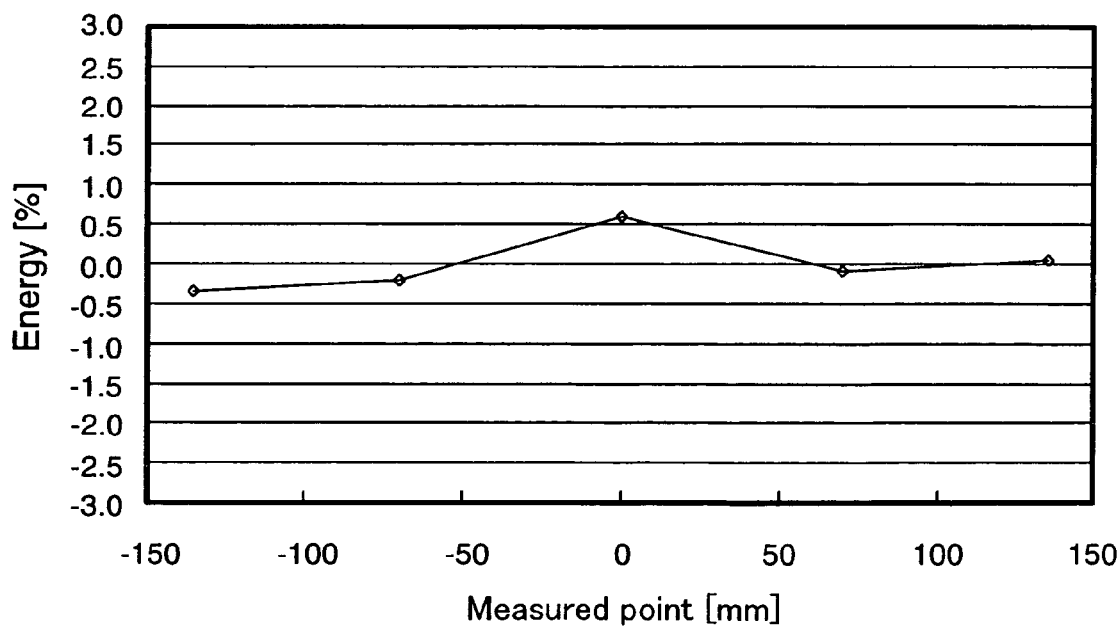

Based on the measured value, FIG. 13A shows a graph of energy distribution of the linear beam in the long-side direction and FIG. 13B shows a graph of fluctuation of the energy intensity to the average value. In FIG. 13A, a horizontal axis shows the length [mm] of the beam and a vertical axis shows the energy [mJ/3 cm]. As shown in FIG. 13A, the homogeneous linear beam having the length of 270 mm in the long-side direction can be obtained. The average energy is 74.66 [mJ/3 cm]. On the other hand, in FIG. 13B, the horizontal axis shows the measured point [mm], and the vertical axis shows the energy [%]. FIG. 13B indicates that the fluctuation of the energy in the long-side direction decreases. Moreover, the range of fluctuation of the energy intensity to the average value is 0.94% (the horizontal axis is in the range of −135 to +135 mm).

Therefore, by using the laser irradiation apparatus of the present invention, the field angle of the ray can be made small, and the homogeneous beam can be formed on the irradiation surface.

This application is based on Japanese Patent Application serial no. 2004-088037 filed in Japan Patent Office on Mar. 24, 2004, the contents of which are hereby incorporated by reference.

What is claimed is:

1. A beam homogenizer comprising:
a first optical element for forming a plurality of first laser beams by dividing a laser beam emitted from a light source in a short-side direction of a rectangular shape;
a second optical element for forming a plurality of second laser beams by dividing the plurality of first laser beams in a long-side direction of the rectangular shape;
a third optical element for forming a plurality of third laser beams by converging the plurality of second laser beams in the long-side direction; and
a fourth optical element for forming a fourth laser beam by converging the plurality of third laser beams in the short-side direction,
wherein an irradiation surface is conjugated through the third optical element with a hypothetical plane where the plurality of second laser beams are superposed when the plurality of second laser beams are extended to a side of the light source.

2. The beam homogenizer according to claim 1, wherein the second optical element is an off-axis cylindrical lens array.

3. The beam homogenizer according to claim 2, wherein the off-axis cylindrical lens array comprises a plurality of off-axis cylindrical lenses, and
wherein a generating line of each of the plurality of off-axis cylindrical lenses is apart from a center axis thereof.

4. The laser irradiation apparatus according to claim 1, wherein the irradiation surface is an amorphous silicon film formed over a substrate.

5. A laser irradiation apparatus comprising:
a laser oscillator for oscillating a first laser beam;
a first optical element for forming a plurality of second laser beams by dividing the first laser beam in a short-side direction of a rectangular shape;
a second optical element for forming a plurality of third laser beams by dividing the plurality of second laser beams in a long-side direction of the rectangular shape;
a third optical element for forming a plurality of fourth laser beams by converging the plurality of third laser beams in the long-side direction; and
a fourth optical element for forming a fifth laser beam by converging the plurality of fourth laser beams in the short-side direction,
wherein an irradiation surface is conjugated through the third optical element with a hypothetical plane where the plurality of third laser beams are superposed when the plurality of third laser beams are extended to a side of the laser oscillator.

6. The laser irradiation apparatus according to claim 5, wherein the second optical element is an off-axis cylindrical lens array.

7. The laser irradiation apparatus according to claim 6, wherein the off-axis cylindrical lens array comprises a plurality of off-axis cylindrical lenses, and
wherein a generating line of each of the plurality of off-axis cylindrical lenses is apart from a center axis thereof.

8. The laser irradiation apparatus according to claim 5, wherein the laser oscillator is an excimer laser, a YAG laser, or a glass laser.

9. The laser irradiation apparatus according to claim 5, wherein the laser oscillator is a $YVO_4$ laser, a YLF laser, an Ar laser, or a $GdVO_4$ laser.

10. The laser irradiation apparatus according to claim 5, wherein the irradiation surface is an amorphous silicon film formed over a substrate.

* * * * *